(12) United States Patent
Harris et al.

(10) Patent No.: US 6,189,982 B1
(45) Date of Patent: Feb. 20, 2001

(54) HYDRAULIC BRAKING SYSTEMS OF THE BRAKE-BY-WIRE TYPE FOR VEHICLES

(75) Inventors: Alan Leslie Harris; Robert Gregory Fuller, both of Coventry; Robert George Uzzell, Worcestershire; Ivan Mortimer, West Midlands, all of (GB)

(73) Assignee: Lucas Industries Limited (GB)

( * ) Notice: Under 35 U.S.C. 154(b), the term of this patent shall be extended for 0 days.

(21) Appl. No.: 09/464,499

(22) Filed: Dec. 15, 1999

Related U.S. Application Data

(63) Continuation of application No. PCT/GB98/01815, filed on Jun. 19, 1998.

(30) Foreign Application Priority Data

Jun. 19, 1997 (GB) .................................................. 9712861

(51) Int. Cl.[7] .................................................. B60T 8/40
(52) U.S. Cl. ..................................... 303/116.1; 303/119.1
(58) Field of Search ........................... 303/113.1, 119.1, 303/119.2, 116.1, 116.2, 901, 122.08

(56) References Cited

U.S. PATENT DOCUMENTS

| 5,544,948 | 8/1996 | Schmidt et al. ................ 303/122.11 |
|---|---|---|
| 5,605,385 | * 2/1997 | Zaviska et al. .................... 303/116.2 |
| 5,690,396 | 11/1997 | Johnston et al. .......................... 303/3 |
| 5,779,328 | * 7/1998 | Mergenthaler et al. .......... 303/116.1 |
| 5,941,608 | * 8/1999 | Campau et al. .................. 303/113.4 |
| 5,979,999 | * 11/1999 | Poertzgen et al. ................ 303/116.1 |
| 5,997,106 | * 12/1999 | Takayama .......................... 303/116.1 |

FOREIGN PATENT DOCUMENTS

| 40 34 839 C1 | 3/1992 | (DE) . |
| 43 43 386 A1 | 6/1995 | (DE) . |
| 0 734 929 A1 | 10/1996 | (EP) . |

* cited by examiner

Primary Examiner—Robert J. Oberleitner
Assistant Examiner—Mariano Sy
(74) Attorney, Agent, or Firm—MacMillan, Sobanski & Todd, LLC

(57) ABSTRACT

An hydraulic braking system of the brake-by-wire type has an hydraulic pressure source comprising an hydraulic accumulator adapted to be charged by a pump. An accumulator isolating valve is so positioned and biased to correspond to the direction of flow from the accumulator to a solenoid-operated proportional valve. The valve is biased into a closed position in opposition to the flow from the pump to the accumulator.

7 Claims, 3 Drawing Sheets

HYDRAULIC BRAKING SYSTEMS OF THE BRAKE-BY-WIRE TYPE FOR VEHICLES

CROSS-REFERENCE TO RELATED APPLICATIONS

This application is a continuation of copending International Application PCT/GB98/01815 filed on Jun. 19, 1998 and which designated the U.S., and which claimed priority to British Patent Application No. 9712861.5 filed on Jun. 19, 1997.

BACKGROUND OF THE INVENTION

This invention relates to hydraulic braking systems of the brake-by-wire type for vehicles of the kind in which hydraulic fluid from a high pressure source is supplied to a wheel brake under the control of a proportional solenoid-operated valve which, in turn, is actuated in response to signals from a pressure transducer associated with a brake-applying pedal.

In known brake-by-wire systems of the kind set forth the high pressure source comprises an hydraulic accumulator which is adapted to be charged by operation of an hydraulic pump. The pressure in the accumulator is determined by a pressure sensor working in conjunction with an isolating valve which is operative to isolate the pump from the accumulator when the pressure in the accumulator attains a given value. This valve effectively isolates the accumulator from the proportional operated solenoid valves so that the accumulator is not discharged due to leakage through the proportional operated solenoid valves when left to stand for a long period.

In one known system of the kind set forth the pressure sensor is located in the first line between the pump and proportional valve, and the isolating valve is located in a second line between the accumulator and a connection in the first line between the pressure sensor and the proportional valve. The relative positions of the pressure sensor and the isolating valve, under certain circumstances, may lead to concerns about reliability, power consumption, safety and packaging of the system. This is because the isolating valve must be opened in order to measure the accumulator pressure.

With regard to reliability the pressure sensor, isolating valve and proportional valve may all be subjected to large-magnitude pressure transients if pressure in a down stream high-pressure supply gallery decays before the isolating valve re-opens. This would occur if pressure in the first line decays over time due to leakage and then the isolating valve is suddenly opened introducing the accumulator pressure to the first line.

Excessive power consumption, leakage and consequent wear and energy consumption (recharging accumulator) will occur if the isolating valve is held open between successive brake applications in order to reduce accumulator-sensor fatigue due to supply gallery decays before the isolating valve re-opens. In addition excess heat dissipation from the solenoid of the isolating valve may occur. The isolating valve must incorporate a spring capable of opposing maximum accumulator pressure to keep the accumulator charged when the supply line pressure has decayed through leakage. Thus a high solenoid force must be maintained after opening to oppose this high spring force.

Since the accumulator pressure is monitored only when the isolating valve is open, periodic opening takes place for monitoring purposes but such movements may exacerbate the reliability problems discussed above. As a result since accumulator faults may not be detected immediately the driver may be unaware of faults when braking is required.

BRIEF SUMMARY OF THE INVENTION

According to our invention in an hydraulic braking system of the brake-by-wire type of the kind set forth in which the hydraulic pressure source comprises an hydraulic accumulator adapted to be charged by a pump, an accumulator isolating valve is located in a main supply line between the accumulator and a feed line to the solenoid-operated proportional valve, the isolating valve being adapted to act as a one-way valve in a first mode of operation to prevent the flow of fluid from the accumulator to the feed line, and adapted to allow fluid to flow in both directions across the isolating valve in a second mode of operation.

Specifically the valve may comprise a valve member adapted to be biased against a valve seat into a closed position in opposition to the flow from the pump to the accumulator. The valve may be biased into this closed position by a spring. The valve may be adapted to be opened by a force generated by a solenoid acting in opposition to the spring force.

The accumulator isolating valve may be so constructed and arranged as to be biased in such a direction as to produce both a pull-in force and a sustained force required to hold the valve open.

In the first mode of operation, the valve may be closed and held in the closed position by a combination of the pressure drop across the valve between the accumulator and the feed line and a biasing force applied to the valve member.

Preferably an accumulator pressure sensor is disposed between the accumulator and the isolating valve.

Conveniently a main pressure relief valve is connected to a line between the pressure sensor and the isolating valve. Alternatively, this may be between the accumulator and the pressure sensor. This allows excess pressure in the accumulator to be relieved through the relief valve instead of the isolator valve. The relief valve may have a manual override to allow pressure in the accumulator to be relieved during servicing.

This arrangement has the advantage that continuous monitoring of accumulator pressure can be achieved without fatigue concerns or unnecessary leakage.

It will be apparent that this arrangement differs from the prior art in that the biasing force applied to the valve acts in opposition to flow from the pump to the accumulator, as distinct from acting in opposition to flow from the accumulator to the pump.

The isolating valve may comprise a solenoid-operated valve. In the first mode of operation, the solenoid may be de-energised and may be energised in the second mode of operation to apply a force opposed to the biasing force.

Because the spring in the isolating valve applies a biasing force to the valve member in opposition to the flow of fluid from the pump to the accumulator, it can be chosen to have a lower spring pressure than when the valve is arranged the other way round when it must exceed the maximum operating pressure in the accumulator. Thus in the present invention, the first current needed to produce a first solenoid force required to open the isolator valve (which must exceed the sum of the spring force and the pressure difference across the valve from the accumulator to the feed line) can be reduced to a second lower current producing a low operating force once the valve is opened and the pressure across the valve has balanced to be substantially equal to the spring force.

As a result less heat dissipation from the solenoid will occur due to a correspondingly reduced hold-in current. In addition packaging is improved due to reduced hold-in forces. Since the relief valve protects the accumulator directly relief threshold is more predictable.

Thus, the isolating valve may be adapted to be driven by a first current upon initial movement from its first mode of operation (valve normally closed) to its second mode of operation (valve open), and the valve held open in its second mode of operation by a second current which is lower than the first current.

The low operating force produced by the second current may be substantially equal to the biasing spring force.

In addition to requiring reduced current in the solenoid, it helps to reduce problems of overheating due to internal resistance in the solenoid.

The pump may be driven by a motor, and a diagnostic means may be provided whereby the integrity of the isolating valve may be checked during operation.

The diagnostic means may be adapted to calculate the motor load when the isolating valve is in the second mode of operation and measure the change in a motor load when the isolation valve is in the first mode of operation. The expected difference in motor load, for example when the accumulator is being charged from the pump, is equal to the biasing force applied to the valve member by the biasing spring.

The diagnostic means may be adapted to produce an output signal indicative of a fault if the difference in the measured motor loads does not exceed a predetermined safe threshold level.

The diagnostic means may be adapted to measure the motor torque and motor speed either directly or indirectly in order to calculate the motor load. In a preferred arrangement, a pulse width modulation (PWM) motor control strategy may be used, and motor torque may be derived from a measurement of the average voltage applied across the motor phase windings.

The presence of the biasing force on the valve member enables the brake system to operate in a "supercharge mode" whereby pressure from the accumulator can be fed to the feed-line during normal braking through the isolator valve, and additional pressure may be generated in the feedline by operation of the pump. The amount of additional pressure that can be supplied by the pump is determined by the biasing force at the isolating valve. If the pressure in the feedline exceeds the pressure at the accumulator by an amount in excess of the biasing force (and any stiction that may be present in the valve), the valve will open to allow the accumulator to be pressurised from the feed line. This can act as a safety limit to prevent over-pressurisation of the feed-line.

In accordance with a second aspect, the invention provides a method of checking the integrity of the isolating valve in the brake system of the first aspect of the invention by measuring the motor load for the pump when the isolating valve is in its first and its second mode of operation.

The method may comprise the steps of measuring the motor load in the first mode of operation, measuring the motor load in the second mode of operation, and comparing the difference between the two loads to the threshold expected difference value.

The two load measurements may be made just before and just after the valve has switched from its first mode of operation to its second mode of operation or vice versa.

Of course, if the pump is driven by an actuator other than a motor, the load of the alternative device could be used in place of a measurement of motor load. In addition, motor load could be measured directly or inferred. It could be inferred by measuring the change in motor speed at a constant drive current.

The present invention enables us to monitor continuously accumulator pressure without fatigue concerns or unnecessary leakage. Only a minimal hold-in current is required and a relatively small heat dissipation from the solenoid of the isolating valve will occur. Improved packaging is achieved due to the reduced pull-in and hold-in forces. Since the relief valve protects the accumulator directly, instead of via a second relief valve, the release threshold is more predictable that will occur above the given pressure, say at 250 bar.

Some vehicle braking systems of the brake-by-wire type are illustrated in the accompanying drawings.

DETAILED DESCRIPTION OF THE INVENTION

Figure 1:
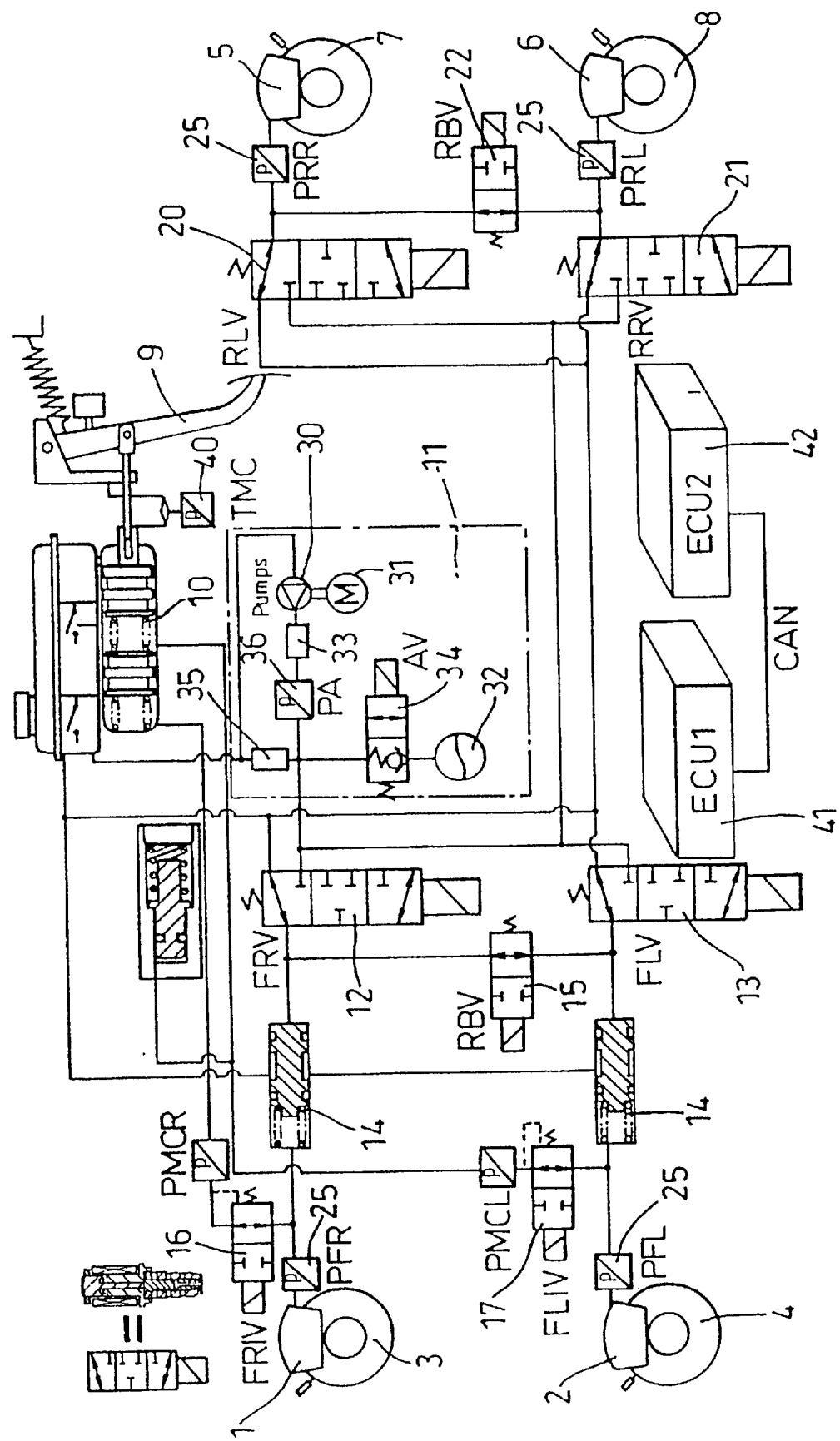
FIG. 1 is a layout of a first arrangement of a braking system.

In the braking system illustrated in the layout of FIG. 1 of the accompanying drawings brakes 1 and 2 on front wheels 3 and 4, and brakes 5 and 6 on rear wheels 7 and 8, are adapted to be applied hydraulically under the control of a brake pedal 9 adapted to operate an hydraulic master cylinder 10 for emergency braking of the system. Each front wheel brake 1,2 is adapted to applied by fluid from an hydraulic high pressure supply system 11 under the control of a respective solenoid operated proportional valve 12,13. An isolating piston 14 is located between each proportional valve 12,13 each a front wheel brakes 1,2.

The pressures between the wheel brakes 1 and 2 are balanced by a balance valve 15. An isolator valve 16,17 is disposed between the master cylinder 10 and each respective brake 1,2.

The brakes 5 and 6 on the rear wheels 7 and 8 are similarly controlled by means of solenoid-operated respective proportional valves 20 and 21, and the pressure between the two brakes is balanced by a balancing valve 22. A pressure transducer 25 is associated with each wheel brake.

The high pressure supply system 11 comprises an hydraulic pump 30 which is adapted to be driven by an electrically operated motor 31. This, in turn, charges an accumulator 32 through a one way valve 33 and an accumulator isolating valve 34. A pressure relief valve 35 is disposed on the downstream side of the accumulator 32, and a pressure sensor 36 is connected between the relief valve 35 and the isolating valve 34 on the downstream side of the one way valve 33.

In operation when the pedal 9 is operated signals from a transducer 40 are fed to a pair of electronic control unit 41,42 which differentiate the signal and emit energising currents effective to initiate operation of the motor 31 and to control operation of the proportional valves 12,13, 20 and 21 so that fluid under pressure from the accumulator 32 is supplied to the wheel brakes 1,2, 5 and 6. The actual brake pressures are regulated by energising currents which, in turn, are regulated by signals from the transducers 25. The first electronic control unit may be integrated into the braking system. The second unit may be a master unit which controls the first unit via a CAN link.

In the event of an electrical failure all the solenoid-operated valves move to neutral positions and the isolating valves 14 act to isolate the front wheel brakes 1 and 2 from the high pressure supply system 11. The isolation valves 16 and 17 open so that further movement of the pedal 9 in a brake applying direction operates the master cylinder to apply the front wheel brakes 1 and 2 by flow through the valves 16 and 17.

Figure 2:
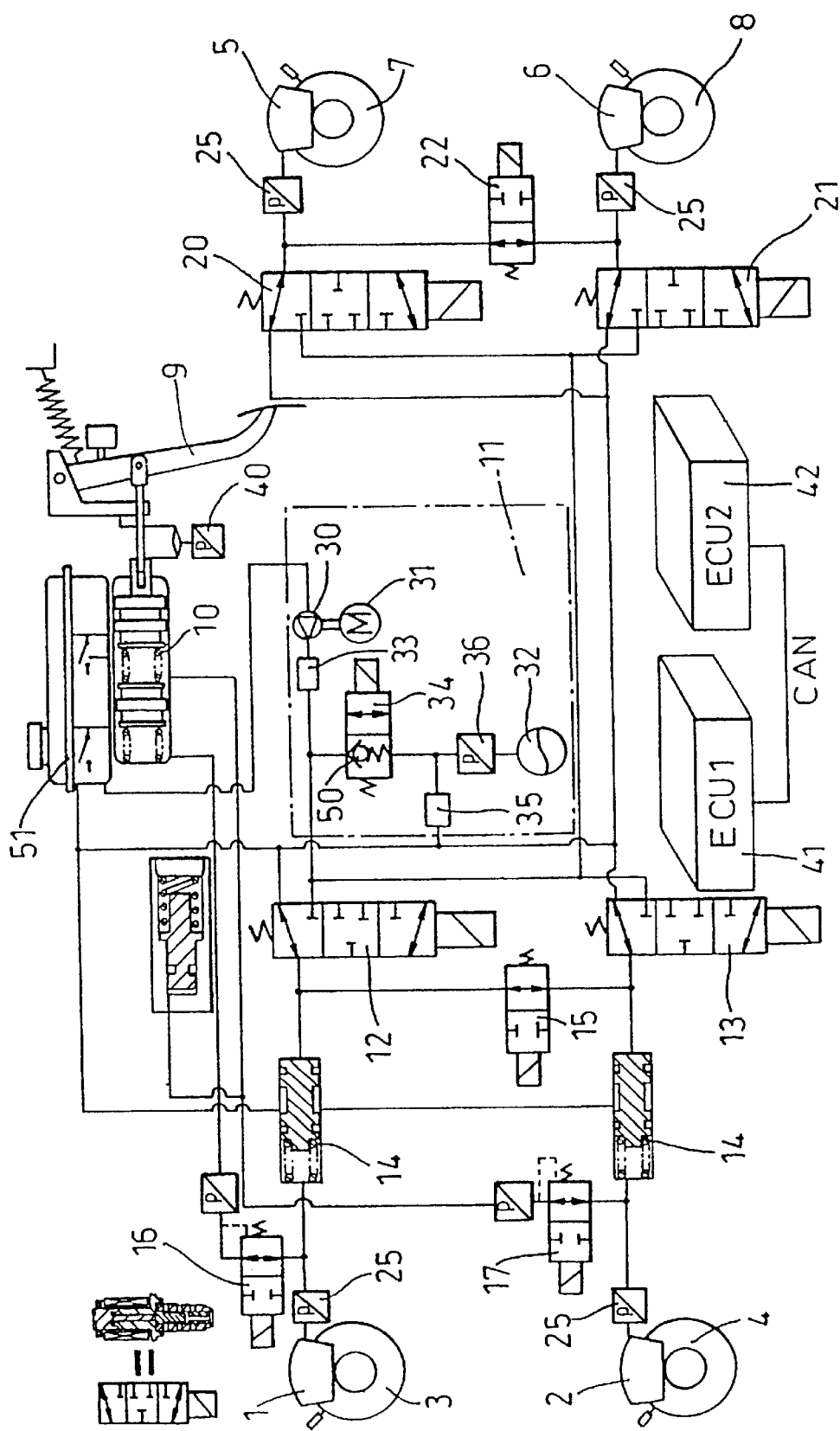
FIG. 2 is a layout of a braking system similar to FIG. 1 but incorporating a pressure supply system in accordance with the present invention.

In the braking system illustrated in the layout of FIG. 2, in the hydraulic supply system 11 the accumulator isolating valve 34 is provided with a one way valve 50 which opens in a direction opposite to the direction of opening of the equivalent valve in the isolating valve of the embodiment of FIG. 1. The pressure sensor 36 is positioned next to the accumulator 32, between the accumulator and the isolating valve 34, and the pressure relief valve 35 is connected in a line between the pressure sensor 36 and the isolating valve 34 and a return line to a reservoir 51 of the master cylinder 10.

In a first mode of operation the one-way valve 50 is biased into a closed position by flow from the accumulator 32 in opposition to the flow from the pump 30 to the accumulator 32. It is also biased into the closed position by a biasing force of a spring Continuous monitoring of the pressure in the accumulator 32 can be achieved without fatigue concern for unnecessary leakage as the valve does not need to be opened to measure the accumulator pressure as in FIG. 1. Since the isolating valve 34 is biased in such a direction as to produce both a pull-in force and a sustained force required to hold the valve 50 open, a relatively light spring can be utilised in the one way valve since such a spring does not have to resist the full accumulator pressure as in the known embodiment of FIG. 1. In practice the spring need only resist the pressure difference between the feed line from the pump and the accumulator pressure.

Locating the pressure relief valve 35 between the pressure sensor 36 and the isolating valve 34 enables the relief valve 35 to protect the accumulator directly such that the relief threshold is more predictable.

In a second mode of operation, the solenoid of the isolating valve is energised to open the valve to allow flow in either direction by applying a solenoid generated force opposed to the spring force.

The braking system of FIG. 2 is otherwise the same as that of FIG. 1 and corresponding reference numerals have been applied to corresponding parts.

Figure 3:
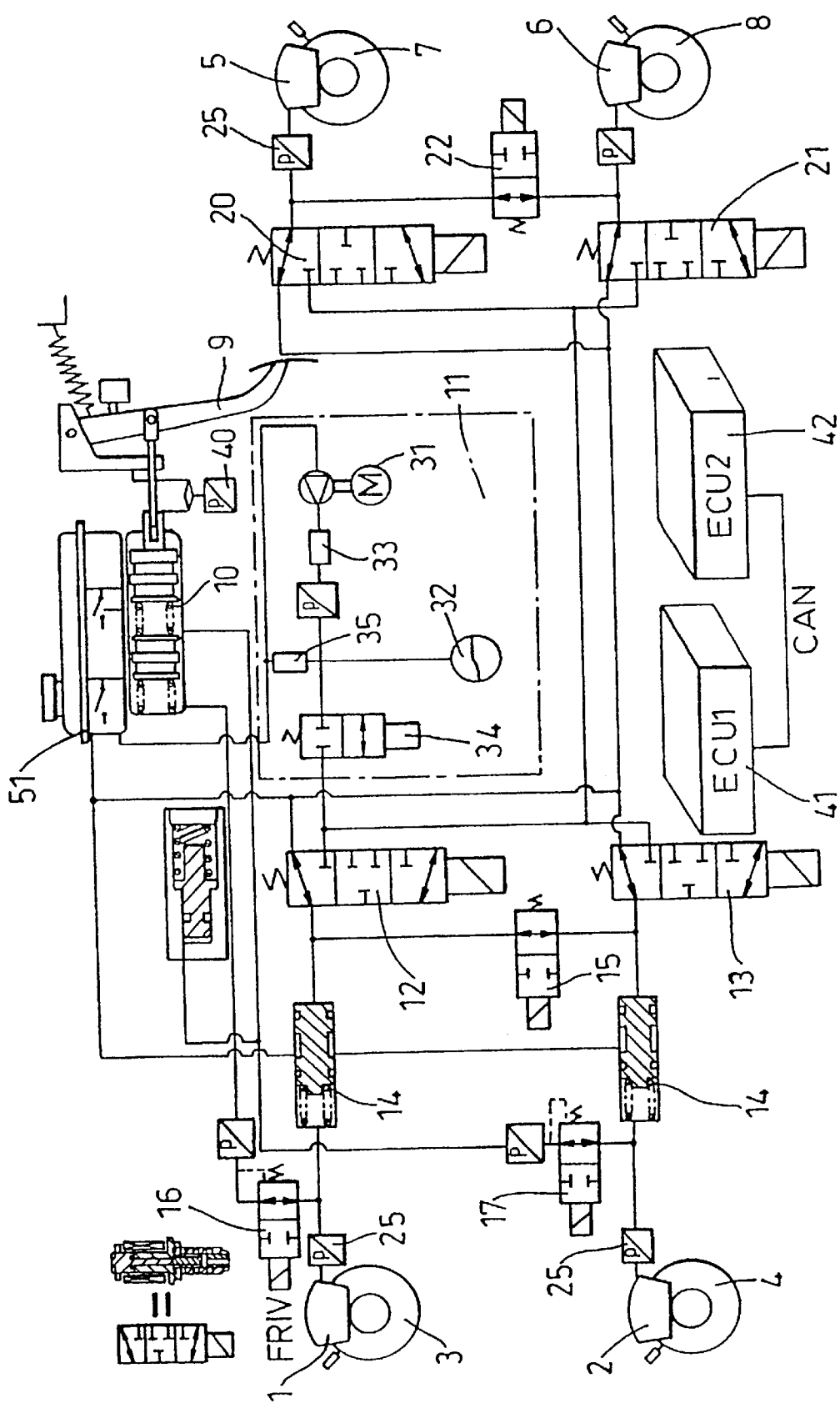
FIG. 3 is a layout of a braking system similar to FIG. 1 but incorporating a modified pressure supply system.

In the braking system illustrated in FIG. 3 of the drawings the isolating valve 34 is located in a main supply line between the accumulator and a feed line to the proportional solenoid-operated valves 12,13,20 and 21. The orientation of the isolating valve 34 is therefore reversed in comparison with the layout of FIG. 1. This enables the biasing of the valve again to be achieved by the relatively light spring. By positioning the isolating valve 34 in the main supply line the relief valve 35 protects the accumulator 32 directly. Again this has the advantage that relief threshold is more predictable.

The construction and operation of the braking system of FIG. 3 is otherwise the same as that of FIG. 1 and corresponding reference numerals have been applied to corresponding parts.

What is claimed is:

1. A hydraulic braking system of the brake-by-wire type comprising a brake-applying pedal, a wheel brake, a hydraulic pressure source, a first pressure transducer, and a solenoid operated valve, in which hydraulic fluid from said hydraulic pressure source is supplied to said wheel brake under the control of said solenoid-operated valve which, in turn, is actuated in response to signals from said pressure transducer associated with said brake-applying pedal wherein said hydraulic pressure source comprises a hydraulic accumulator adapted to be charged by a pump, and a solenoid-operated accumulator isolating valve is located in a main supply line between said accumulator and said solenoid operated valve, and wherein said solenoid-operated valve is a proportional valve and said isolating valve is de-energised in a first mode of operation and adapted to act as a one-way valve in said first mode of operation substantially to prevent the flow of fluid from said accumulator to said supply line through said isolating valve, and adapted to allow fluid to flow in both directions across said isolating valve in a second mode of operation in which the solenoid of said isolating valve is energized, wherein said solenoid of said isolating valve is initially operated by a first current to produce a first operating force on movement of the isolating valve from a closed to an open position, and held in the open position by a second current to produce a second operating force lower than said first operating force.

2. A hydraulic braking system according to claim 1 wherein said second operating force generated by the second current is substantially equal to a biasing force.

3. A hydraulic braking system according to claim 1, wherein a diagnostic means is provided whereby the integrity of the isolating valve is checked.

4. A hydraulic braking system according to claim 3 wherein said diagnostic means is adapted to calculate a load on a motor adapted to drive said pump when said isolating valve is in the said second mode of operation and when said isolating valve is in the said first mode of operation.

5. A hydraulic braking system according to claim 4 wherein said diagnostic means is adapted to compare the difference between the motor load measured when said isolating valve is in the said first mode of operation to the motor load when the isolating valve is in the said second mode of operation, and produce an output indicative of a fault in the event that the difference exceeds a predetermined safe threshold level.

6. An hydraulic braking system according to claim 3, wherein said diagnostic means is adapted to measure speed and voltage applied to said motor.

7. A method of checking the integrity of an isolating valve in a brake system comprising an hydraulic braking system of the brake-by-wire type comprising a brake-applying pedal, a wheel brake, a hydraulic pressure source, a first pressure transducer, and a solenoid-operated valve, in which hydraulic fluid from said hydraulic pressure source is supplied to said wheel brake under the control of said solenoid-operated valve which, in turn, is actuated in response to signals from said first pressure transducer associated with said brake-applying pedal wherein said hydraulic pressure source comprises an hydraulic accumulator adapted to be charged by a pump, and an accumulator isolating valve is located in a main supply line between said accumulator and said solenoid-operated valve, and wherein said solenoid-operated valve is a proportional valve and said isolating valve is adapted to act as a one-way valve in a first mode of operation substantially to prevent the flow of fluid from said accumulator to said supply line through said valve, and adapted to allow fluid to flow in both directions across said isolating valve in a second mode of operation, said method comprising measuring the load on a motor adapted to drive said pump when said isolating valve is in a first mode of operation and in a second mode of operation, and comparing the difference between the said two measurements with an expected value.

* * * * *

UNITED STATES PATENT AND TRADEMARK OFFICE
CERTIFICATE OF CORRECTION

PATENT NO. : 6,189,982 B1
DATED : February 20, 2001
INVENTOR(S) : Alan Leslie Harris, et al.

It is certified that error appears in the above-identified patent and that said Letters Patent are hereby corrected as shown below:

In Column 6, Claim 7, line 11, delete "an" and insert --a--.
In Column 7, Claim 7, line 2, after the second "said" insert --isolating--.
In Column 7, Claim 7, line 5, delete "the" and insert --a--.

Signed and Sealed this

Twenty-ninth Day of May, 2001

Attest:

NICHOLAS P. GODICI

*Attesting Officer*     Acting Director of the United States Patent and Trademark Office